July 9, 1935.  W. A. BERGSTROM  2,007,171

SPRING LOCK NUT

Filed May 23, 1934

INVENTOR.
William A. Bergstrom.
BY
Townsend and Loftus.
ATTORNEYS.

Patented July 9, 1935

2,007,171

UNITED STATES PATENT OFFICE 2,007,171

SPRING LOCK NUT

William A. Bergstrom, Oakland, Calif., assignor to Renchtite Spring Nut Co. (formerly Nanfeldt Corporation, Ltd.), San Francisco, Calif., a corporation of California Application May 23, 1934, Serial No. 727,039

5 Claims. (Cl. 151—21)

This invention relates to a spring lock nut and especially to improvements in the construction and operation of the type of nut disclosed in my issued patent entitled "Self locking nut," No. 1,861,833, of June 7, 1932.

The object of the present invention is generally to improve the construction and operation of nuts of the self-locking slotted type, and particularly to provide a stepped, angularly slotted nut so adapted as to increase the resiliency or spring action of the nut and to prevent the two sections of the nut from "freezing" by reason of rust after being set up so as to prevent its release, and to cause the slot to cross or intersect more threads throughout the body of the nut and thereby distribute the load between two or more threads. Furthermore, to provide such a nut wherein the angular slot crosses the horizontal median line of the nut so as to permit a wrench, when applied, to enclose a greater portion of the slotted area of the nut and thereby eliminate the possibility of breakage; to provide such a nut in which a minimum of material is removed during the slotting operation, thereby producing a stronger and more durable nut; to provide an angularly slotted nut in which it is possible to control the spring or flexing of the metal to a degree which makes it impossible to overstress the resiliency or elastic limit of the nut by adjusting the position of the step, thereby preventing fatigue or crystallization from taking place and as such prolonging the life of the nut; to provide an angularly slotted nut which makes it possible to use material of higher carbon content and Brinnell hardness and therefore effect a greater resiliency; to provide a nut of the character described which, when tightened or set up, automatically effects a pitch differential with the threads on the bolt and this differential is sufficient to effectively block the threads between the nut and the bolt, the differential being maintained while the nut is set up but being immediately released when the nut is turned away from its work because of the spring action of the nut.

The nut is shown by way of illustration in the accompanying drawing, in which—

Figure 1:
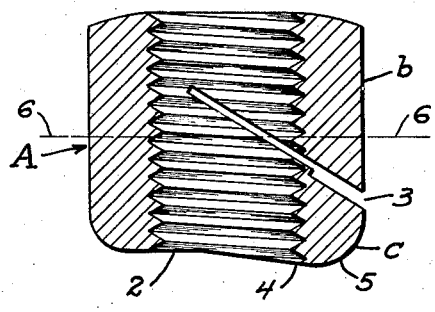
Fig. 1 is a central vertical section of the nut.
Figure 2:
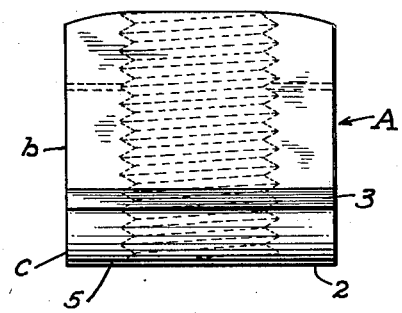
Fig. 2 is a side elevation showing the slotted side of the nut.
Figure 3:
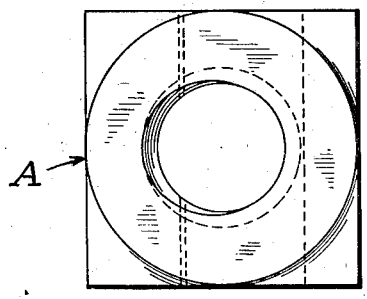
Fig. 3 is a plan view of the nut.
Figure 4:
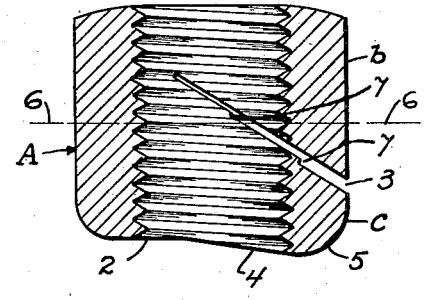
Fig. 4 is a modification showing a plurality of steps.

The nut A is of hard spring steel material, so that when slotted in the manner later described to provide the upper and lower spring sections b, c, it will possess such inherent elasticity as to allow the nut to close and grip and hold the threads of the bolt; yet when released by a suitable wrench, will resume its former shape without permanent set or distortion, enabling the same nut to be used again.

Referring to the drawing in detail, it will be noted that the nut A illustrated follows the usual standards as to width, thickness and bore, whether the nut be square or hexagonal in shape, following either U. S. S. or S. A. E. standards and according to the use to which the nut is put. This nut A being a lock nut differs however from the standard nut markedly, in the formation of the base or bottom surface 2, and also in being provided with a stepped angularly positioned slot 3.

The nut shown in the present application differs in turn from the nut shown in my patent aforesaid in two essential particulars, to wit: the angular position of the slot and the step formed therein whereby a line contact between the two connected spring sections of the nut is produced rather than a broad surface contact, as provided in the said patent, for purposes hereinafter more fully set out.

The under surface 2 of the nut presents an angular or downwardly sloping face 4 which functions as a cam or fulcrum to jam the nut against the bolt when the nut is being set up or tightened. This angular portion 4 of the face terminates in a rounded corner or fulcrum 5 extending along the base of the nut, the rounded portion being important as it reduces the initial torsional stress which would be caused by a sharp cornered fulcrum at the point where the nut first comes in contact with the work. By rounding the corner of the base of the nut, as shown at 4, the fulcrum is brought closer to the longitudinal axis of the threaded bore and the nut can be tightened and locked very much better than by the arrangement of my former patent.

The slot 3 employed is angularly disposed and crosses the median line 6—6 of the nut preferably at an angle of approximately 30° to the median line 6—6 or 60° to the axis of the threaded bore. The inner end of the slot is disposed a considerable distance above the median line and the open or outer portion, a considerable distance below. By providing an angularly disposed slot of the character described, several threads are intersected or crossed, thus making it possible to distribute the load more uniformly on the threads when the nut is being tightened or set up.

It should also be noticed that the slot is stepped, as indicated at 7. There may be one or more of said steps.

This stepped construction, together with the angular position of the slot, is an important feature, as will hereinafter appear.

By reason of this disposition of the slot and the differing widths to provide the step or steps 7, new and greatly improved results are produced over anything in the prior art, as for example:

The nut shown in the present application is much stronger because less material is removed in the slot on account of the step; also, it is much stronger because of the graduation in the width of the slot, that is, there is less material removed from the body of the nut in the weak part of the body, that is, through the bore, and that naturally makes a stronger bodied nut when comparison is made with the nut shown in my former patent. This nut is stronger because the slot being in an angular position allows the jaws of a wrench to grip more of the slotted surface than is possible with a horizontally slotted nut, thereby eliminating breakage.

The slot being disposed on a more abrupt angle provides a longer leaf spring action, it being an established fact that the longer the leaf of a spring, the more resiliency is effected. Also in this connection, an angular slot provides more resiliency than a horizontal slot, the reason for this being that with an angular slot the rolled plane of the metal is not paralleled. This feature of not paralleling the rolled plane of the steel also adds to the strength of the nut.

One feature of great importance, as stated above, is the step in the slot. Its advantages are as follows: The step is formed from the outside of the nut and extends toward the bore. This portion of the nut is thick and is the strongest part of the nut. The step portion may be made sufficiently wide to make possible a maximum compression and yet by stopping the step at a point adjacent the bore, any stress desired can be applied between the nut and the bolt. Another important thing about the step is that it provides a stop to the bending of the lower member of the nut, that is, the step can be so graduated as to prevent an overstress of the bending strength of the metal, so that the elastic limit of the steel is not exceeded. This is very important because when the elastic limit of any metal is exceeded, the spring or resiliency is destroyed and fatigue and crystallization set in. From practical results obtained by the use of this invention, it is believed that a nut of this type will last almost indefinitely without fatigue setting in and this is due to the fact that the elastic limit of the metal will never be destroyed due to the provision of the stop.

By properly designing the angular base of the nut to conform with the width of the slot, a perfect bearing of the contact surface of the nut with the work may be effected. This is exceedingly desirable as it can not be accomplished where lock washers are employed.

A very practical advantage of "stepping" the slot is the prevention of the nut "freezing" so it can be released only with the greatest difficulty. In some instances where nuts are subjected to outside exposure in wet climates along the seashore, and so on, there is a tendency for a nut of the straight slot type with parallel or straight faces to rust and the nut thus becomes frozen and permanently distorted with respect to the bolt. This tendency is very much reduced or eliminated with the step employed in the present type of nut forming a line contact only between the two sections; the slot always remaining sufficiently open to prevent such freezing or, if there is freezing, it is only on a transverse line leaving the wider mouth of the slot open to admit a chisel or the like, whereby the sections can be spread and the nut, by reason of its inherent resiliency, be removed.

Because of the fact that the angularly stepped nut here shown is exceedingly strong, it is possible to use a higher carbon steel which may be heat-treated to Brinnell hardness, which will permit the making of the nut to develop the full tensile strength of the heat-treated or alloy bolts. Because this nut may be set up to the full strength of the bolt due to the fact that a perfect bearing is afforded against the work, there is eliminated, almost entirely, any grinding wear at the head of the bolt and at the work surface, and yet, because of the resiliency or reactive pressure in the nut, an elastic joint is possible. In other words, this nut has all the virtue that any lock washer could possibly have in providing a cushion to take up the tort tension, vibration, expansion and contraction, and in the case of railroads, the rolling, pounding action which takes place at rail connections.

Attention should also be directed to the radii or champering at the bottom of the nut below the slotted surface. This is necessary in order that the nut may be moved down freely without the initial torsional strain which would be set up if this radii was not effected.

In the operation of the nut it must be considered that the angular base of the nut is so designed that when the nut is properly applied to the work, the bending of the lower member of the nut through the action which takes place in the slot will effect a perfect bearing between the contact surface of the base of the nut against the contact surface of the work to which the nut is applied, and because of the resiliency of the material from which the nut is made, there is a leaf spring action which is constantly pressing against the work in a reactive manner. Practical tests have demonstrated that it requires great initial torque to start the nut back from the work, that is, to break the nut away from its contact with the work surface, but after this initial torque has been applied the nut may be freely removed as the slot will react to practically its original width; hence there is no danger of the nut working loose as it requires an initial amount of rotation before it becomes free.

Practically all manufacturers of machines and machinery have now come to the use of fine heat-treated or alloy steel non-stretchable bolts. Some are still using soft nuts with lock washers, the softness of the nuts being for the purpose of setting them into the hard steel washers; others, including some of the railroads, on rail connections have eliminated the use of lock washers entirely and instead are using heat-treated nuts in which there is a pitch differential with the threads on the bolts. When the nut shown in this application is set up or tightened, it effects automatically the pitch differential with the threads on the bolts and this differential is just sufficient to effectively block the threads as between the nut and the bolt; and this differential is constantly maintained while the nut is set up, but it is immediately released when the nut is turned away from its work because of the spring action.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A spring lock nut comprising a body portion having a central threaded bore, said nut having a transverse slot formed therein disposed at an angle with relation to the longitudinal axis of the bore, and a plurality of steps formed in the slot.

2. A spring lock nut comprising a body portion having a central threaded bore, said nut having a transverse slot formed therein disposed on an angle with relation to the longitudinal axis of the bore, said slot extending through one face of the nut and into the threaded bore, the two portions of the nut thus formed by the slot having inherent resiliency, and a step or ledge formed in a wall of the slot whereby when the nut is compressed the edge of the step presents a line contact only between the opposite walls of the slot, said step or ledge being positioned between the exterior face of the nut and the threaded bore.

3. A spring lock nut comprising a body portion having a central threaded bore, said nut having a slot formed therein disposed on an angle with relation to the longitudinal axis of the bore, said slot extending through one face of the nut and into the threaded bore and crossing the median line of the nut, and a step or ledge formed in a wall of the slot providing a line contact only between the walls of the slot when the nut is tightened and locked, the portion of the slot beyond the step towards the mouth of the slot being substantially wider than the inner portion of the slot.

4. A spring lock nut comprising a body portion having a central threaded bore, said nut having a transverse slot formed therein disposed at an angle with relation to the longitudinal axis of the bore, and a step or ledge formed in the slot at a point exterior of the threaded bore for limiting the closing of the slot when the nut is set up on the bolt, the position of the step and the width of the slot being such that a substantial portion of the slot on each side of the step will remain open after the nut is set up and locked and thereby prevent the nut becoming frozen by rust.

5. A self locking spring nut comprising a nut body formed of a single piece of resilient material having a transverse diagonally disposed slot formed therein, said slot being of such angularity with respect to the axis of the bore as to intersect a plurality of threads and to extend a substantial distance above and below the transverse median line of the nut, said slot being of stepped formation whereby when the nut is compressed a line contact between the opposite walls of the slot is formed leaving a substantial portion of the walls of the slot on both sides of the step or ledge out of contact with one another.

WILLIAM A. BERGSTROM.